May 15, 1923.
J. BLACKBURN
GEAR SELECTING AND CHANGING DEVICE
Filed Sept. 2, 1919   3 Sheets-Sheet 3
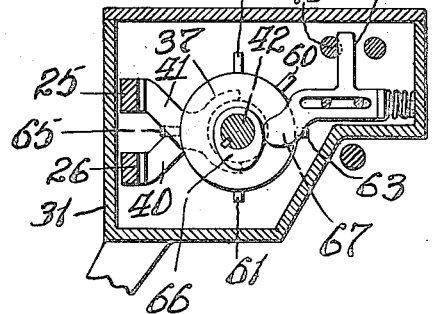
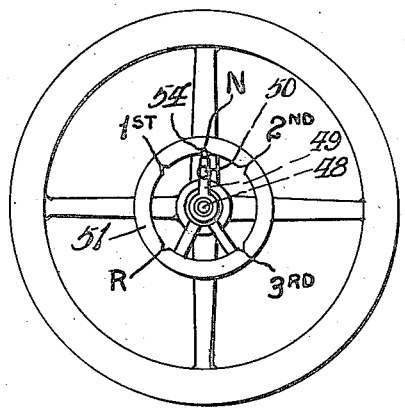
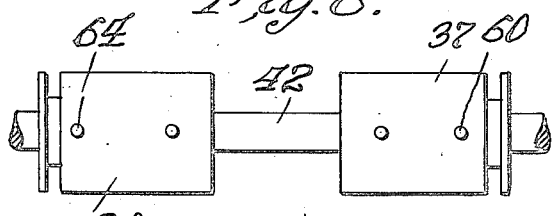
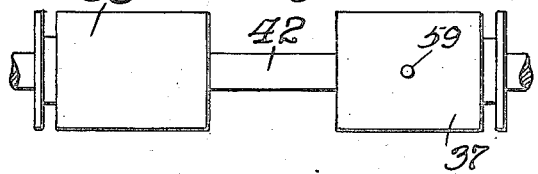
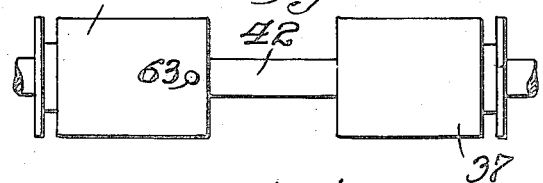
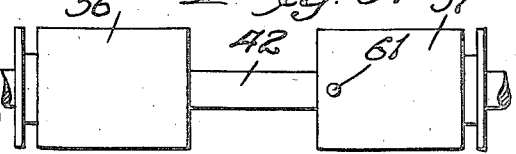
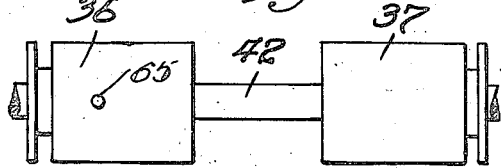
Inventor:
Jasper Blackburn.
By Edward E. Longan
atty.

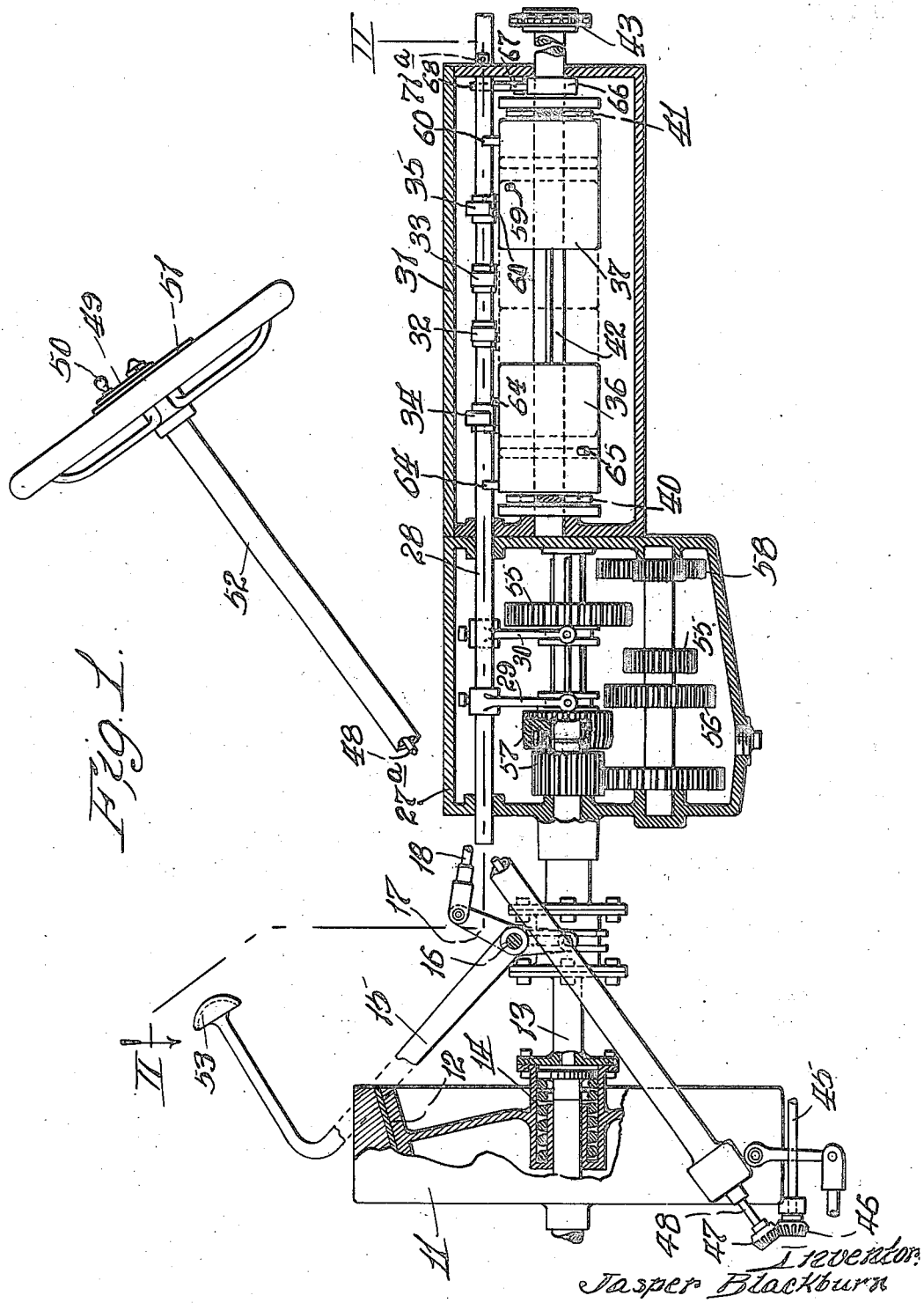

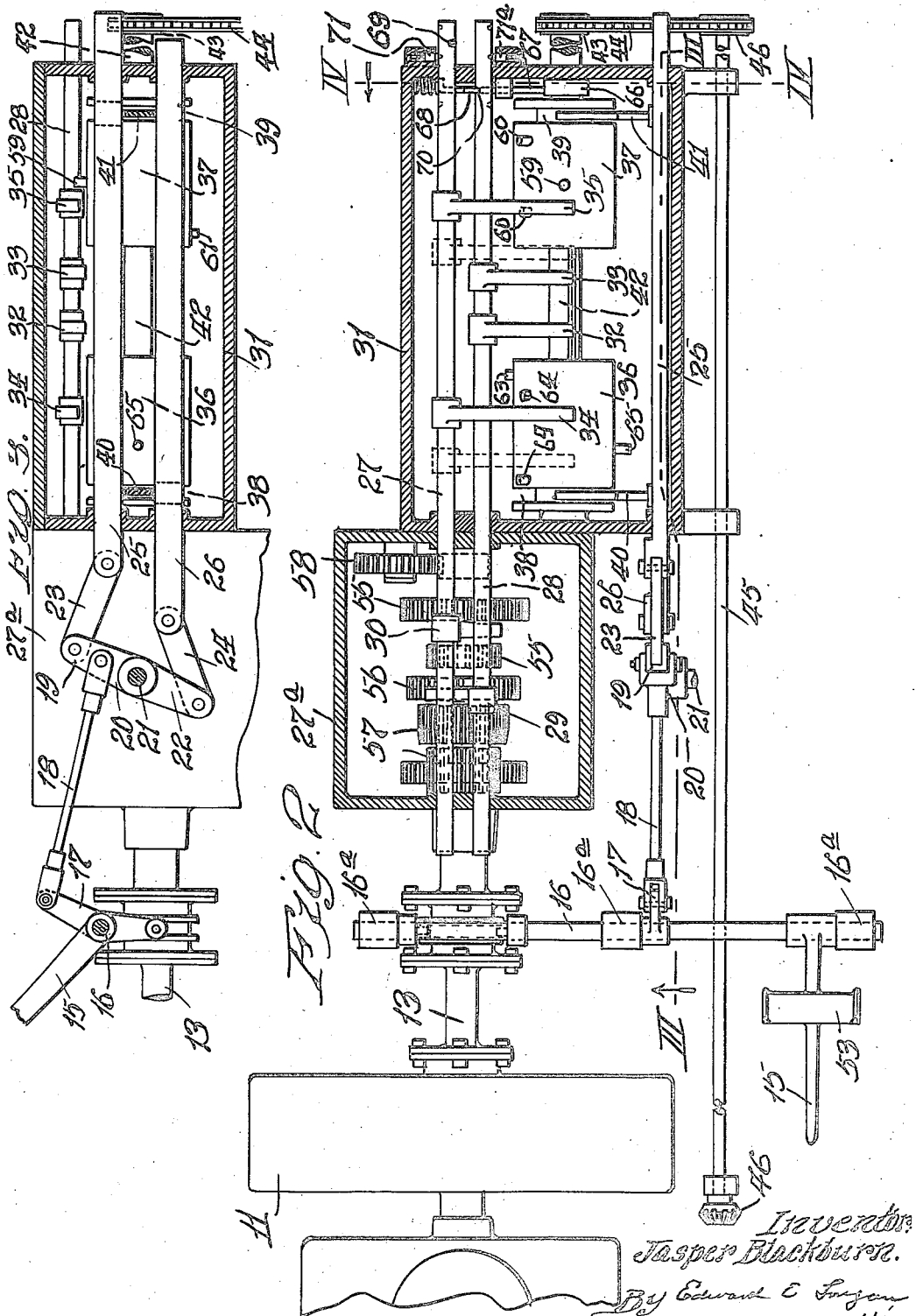

Patented May 15, 1923.

1,455,161

UNITED STATES PATENT OFFICE.

JASPER BLACKBURN, OF WEBSTER GROVES, MISSOURI.

GEAR SELECTING AND CHANGING DEVICE.

Application filed September 2, 1919. Serial No. 321,106.

*To all whom it may concern:*

Be it known that I, JASPER BLACKBURN, a citizen of the United States, and resident of Webster Groves, county of St. Louis, and State of Missouri, have invented certain new and useful Improvements in Gear Selecting and Changing Devices, of which the following is a specification containing a full, clear, and exact description, reference being had to the accompanying drawings, forming a part thereof.

My invention relates to improvements in gear selecting and changing devices, and has for its primary object a manually operated device carried by the steering wheel and accessible to the operator for indicating the speed, corelated to a foot operated gear changing or shifting device.

Another object of my improvement is the construction of such devices that may be connected with any form of sliding gear and reverse transmission and without changing the transmission.

The general object of my improvement is a simplified construction for selecting and indicating the speed of the automobile in which my device is most adaptably to be used, and changing the gear by the foot of the operator to produce the selected and indicated speed, thus eliminating the gear shifting lever which is usually employed in machines and its consequent disadvantages.

In the drawings,

Fig. I is a longitudinal vertical section of my improvement, the transmission, part of the engine fly wheel, and clutch in section.

Fig. II is a horizontal section taken approximately on the line II—II of Fig. I.

Fig. III is a section taken on the line III—III of Fig. II, especially illustrating the means by which the gear shifting device is operated.

Fig. IIII is a transverse section taken on the line IIII—IIII of Fig. II.

Fig. V is a top plan view of the steering wheel and indicating device.

Figs. VI to X inclusive are views of the selecting elements in diagrammatic formation, illustrating the selected positions of the shifting pins in the positions which they assume when ready to shift the gears of the transmission into the desired position.

Although I have shown my improvement applied to a three speed sliding gear and reverse transmission, I may apply it to any sliding gear transmission without departing from the spirit of my invention.

Referring to the drawings, 11 indicates the fly wheel of the engine, and 12 the clutch cone mounted on the clutch or driving shaft 13. As illustrated the clutch shaft is held in operated position by means of the coil spring 14, and is released by the clutch lever 15. The clutch lever 15 is fulcrumed on the shaft 16 running transversely of the chassis and mounted in bearing 16ª. Mounted on the shaft 16 is a crank arm 17 to which is pivotally secured a rod 18, which rod is pivotally secured to the arm 19 of the lever 20. The lever 20 is mounted on the shaft 21, and is provided with another arm 22. Secured to the arms 19 and 22 of the lever 20 are links 23 and 24, the link 23 being pivotally secured to a bar 25, and the link 24 being secured to a bar 26.

27ª indicates the casing for the transmission and in which is mounted a three speed sliding gear and reverse transmission, and mounted within said casing are reciprocating bars 27 and 28, these bars being the usual bars, except slightly longer than those employed in sliding gear and reverse transmission.

Mounted on the bar 28 is a fork 29 for shifting the gears, and mounted on the bar 27 is a fork 30 for shifting the gears.

The transmission casing is supported in the usual manner by transverse members carried by the chassis not shown. Likewise the casing 31 of my gear shifting device is supported.

The operative part of my gear shifting device is mounted in the casing 31, and as previously pointed out, includes the bars 27 and 28, and on the bar 28 are mounted fingers 32 and 33 for actuating the bars for second and third speed, and on the bar 27 is mounted fingers 34 and 35, the former being the reverse finger, and the latter the finger for shifting to first speed.

Rotatingly and reciprocatingly mounted in the casing 31 are drums or rotating members 36 and 37, the drum 36 being provided with a peripheral groove 38, and the drum 37 being provided with a peripheral groove 39. Secured to the bar 26 is a fork 40. Mounted in the groove 38, and secured to the bar 25 is a fork 41 located in the groove 39. The function of these forks is to shift the rotating members 36 and 37 when the bars 25 and 26 are reciprocated. As the bars 25 and 26 are mounted to reciprocate simultaneously and in opposite directions, it is obvious that the forks 40 and 41 and the rotating members 36 and 37 will be likewise moved.

The bars 25 and 26 are operated by the structure heretofore defined by means of the crank arm 17, the rod 18, the lever 20, and links 23 and 24.

The rotating members 36 and 37 are reciprocated on the shaft 42. One end of the shaft 42 projects through the casing 31, and has mounted thereon a sprocket wheel 43, on which is mounted a sprocket chain 44.

45 indicates a shaft extending longitudinally of the machine, and mounted in suitable bearings not shown, and on one end of which is mounted a sprocket wheel 46ª, and by means of which a rotary movement is imparted to the rotating members or drums 36 and 37, it being noted in this connection that said members are free to move on the shaft 42, but do not rotate thereon.

The forward end of the shaft 45 is provided with a bevelled gear 46, which meshes with the bevelled gear 47. The bevelled gear 47 is operated by means of an operating rod 48, which rod is rotated by means of an arm 49, provided with a knob 50. The arm 49 is mounted on the upper end of the rod 48, and is located above the indicator 51, which is carried by the steering column 52.

The operating rod 48 projects entirely through the steering column 52. By means of the lever arm 49 adjacent to the steering wheel, and accessible to the operator, a rotary movement may be imparted to the rotating members or drums 36 and 37 for selecting the gear to be shifted, and when the selection has been made, the gears are shifted by means of the pedal 53 mounted on the lever 15, the shifting of the sliding gears being effected by means of pins or projections mounted on the drums 36 and 37 which come in contact with the fingers mounted on the gear shifting bars 27 and 28.

The indicator 51 is provided with a dial indicating first, second and third speed, neutral and reverse, and I employ a spring held detent 54 for temporarily holding the same in the desired set position.

The transmission as previously referred to, to which I have shown my improvement attached, is a three speed sliding gear and reverse transmission, and is provided with first speed gears 55, second speed gears 56, and third speed gears 57, and a reverse 58, the transmission being illustrated in Fig. 1 in neutral position, and in Figs. II and III the drums 36 and 37 are set for first speed. The rotating drums or members for selecting the desired speed and operated by the arm 49 are provided with radially disposed pins or projections, which may be set by the adjustment of the drums to come in contact with the fingers carried by the gear shifting bars 27 and 28.

The drum 37 is provided with a pin 59, which may be set for first speed, and a pin 60 for neutral, and a pin 61 for third speed, and the drum 36 is provided with a pin 63 for second speed, a neutral pin 64, and a reverse pin 65.

When the drums have been adjusted as desired by means of the arm 49 on the steering wheel for neutral, first, second or third speed by operating the pedal 53, the pin selected for the desired speed will engage with the fingers carried by the gear shifting bars and throw in the gear to produce the desired speed.

In the illustration, (Fig. I) the transmission is in neutral position and so indicated by the pointer in Fig. V, and in Fig. VI the position of the pins on both drums are indicated. If it is desired to shift to first speed, the arm 49 is turned to position on the dial indicating first speed. This adjustment of the handle 49 will rotate the drums and they will occupy the position shown in Figs. II, III and VII. If it is desired to change to second speed the pins for shifting the gear shifting bars will be in position as illustrated in Fig. VIII, and for third speed in position as illustrated in Fig. IX.

If the drums are adjusted for reverse, the finger engaging pin on drum 36 will occupy the position as shown in Fig. X. The transmission to which my improvement is applied is capable of producing three speeds ahead reverse and neutral.

In Figs. II and IIII I have illustrated a means for locking the gear shifting bars 27 and 28, and for this purpose I form or mount on the shaft 42 a cam 66, and on the inside of the casing I mount a spring pressed dog 67 provided with a locking arm 68, adapted to be seated in notches 69 and 70 formed in these bars. The rotation of the shaft 42 operates this spring pressed dog and its locking arm.

In Fig. II where the device is set for first speed the bar 28 is locked. In the operation of setting the drums 36 and 37 the rotation of the shaft 42 and cam 66 will release the bar 28, and the continued rotation will cause the arm 68 to engage with notch 69 of the bar 27. The special purpose of this locking device is to lock the bar not being used in neutral position. Mounted adjacent to the bar 27 is a spring held detent 71, and adjacent the bar 28 is a spring held detent 71ª. These are for the purpose of preventing the bars from becoming displaced by the vibration of the machine, but do not prevent the operation of the bars when desired for shifting the gears.

It will be observed from Figs. II—III and IIII that the pins mounted on the drums are of different length so that some of them may clear the fingers mounted on the gear shifting bars, and some will engage the same for operating the said bars.

The operation of my device is as follows:

When the parts have been assembled as heretofore described, they may be attached to any sliding gear transmission by substituting new, or making longer the gear shifting bars 27 and 28 to be actuated by the pins on the drums 36 and 37.

If it is desired to change the speed from neutral the position shown in Figs. I and VI to first speed as shown in Figs. II and III, the arm 49 will be moved to this position shown by the dial carried by the wheel.

This movement will rotate the drums 36 and 37, so that the pin on the drum 37 will occupy the position as shown in Figs. II, III and VII, then by operating the pedal 53, the drum 37 will be carried forward by bar 25, and the gears 53 will be placed in mesh.

It will be observed in this connection that when the drum 37 is carried forward, the drum 36 will move in the opposite direction at the same time.

If it is desired to change to second speed, the arm 49 would be moved to neutral position, and the pedal 53 operated. All gears will then be in neutral position. Then the arm 49 is moved to the second speed indication, and the pin 63 on the drum 36 will be brought in a position as illustrated in Fig. VIII, so as to act on the second speed operating finger 32, carried by the gear shifting bar 28. This operation will place in mesh gears 56 and 57, it being noted in this connection if it is desired to set from second to third, move the indicator to third position and operate the pedal 53. In other words to shift from first or reverse to second or third, I first set the indicator to indicate a neutral position, and then by operating the pedal 53, the gears are set in neutral position, and then by moving the arm 49 to either second or third position, the drums will be so adjusted as to give the second or third speed.

In this connection it will be observed that the bar 27 is a bar for shifting the gears to reverse and first speed, and the bar 28 is for shifting the gears to second and third speed.

It will further be observed that the rotating drum or member 37 has a pin to set the gears for neutral, one for first speed, and one for third speed, and the rotating drum 36 has a pin to set the gears for neutral, second speed and reverse, that the crank arm 49 is so related to these drums that by one complete turn of the arm the drums will make one complete rotation.

By such a construction of gear selecting and shifting device, I am able to set the gears in neutral position, and in position for first, second and third speed and reverse.

It will be further observed that the operation of the clutch lever 15 for releasing the clutch cone will simultaneously operate the gear shifting device, as both are mounted on the same shaft, that is to say when the clutch cone is released from the power, the gears may or may not simultaneously shift, depending on the position of the drums carrying the pins for operating the gear shifting bars, and furthermore that any predetermined position of the gears either for neutral, first, second or third speed or reverse is determined and controlled by the arm 49 carried by the steering wheel and readily accessible to the operator.

It will further be observed that the pins are so positioned on the drums 36 and 37 that the clutch can be slightly disengaged from the fly wheel without the pins contacting the gear shifting fingers.

While I have shown the gear shifting drums 36 and 37 for moving toward each other, they can be just as effectively arranged by different location of the pins to work from each other.

Having fully described my invention, what I claim is:

1. A gear selecting and changing device comprising in combination with a sliding gear transmission provided with gear shifting bars and forks, a pair of spaced apart reciprocating and rotating members, pins carried by said members, fingers mounted on the gear shifting bars, means for adjusting said rotating and reciprocating members from the steering wheel, so that certain ones of said projections may contact with and actuate certain of said fingers and the bars on which they are mounted, a foot pedal, means for preventing accidental movement of the gear shifting bars, and a rod and lever connection between said foot pedal and rotating and reciprocating members for moving them both simultaneously in the opposite direction.

2. A gear selecting and changing device comprising in combination with a sliding gear transmission provided with gear shifting bars and forks, a pair of spaced apart reciprocating and rotating members, pins carried by said members, fingers mounted on the gear shifting bars, means for adjusting said rotating and reciprocating members from the steering wheel so that certain of said projections may move in the path of and actuate certain of the fingers, and the bar on which the fingers are mounted, a clutch and a lever connection between the clutch and said rotating and reciprocating members whereby upon the movement of the clutch the said rotating and reciprocating members may be simultaneously moved.

3. In a gear selecting and changing device, a clutch lever, a pair of spaced apart rotating and reciprocating members, gear shifting bars, fingers mounted on said bars, selecting means carried by the rotating member for actuating said bars, a connection between the rotating members and clutch lever and means carried adjacent the steering wheel of the machine for adjusting the rotating members, a pedal and a lever connection between the pedal and rotating members for reciprocating said rotating members simultaneously in the opposite directions, and means for preventing the accidental movement of the gear shifting bars.

4. A gear selecting and changing device comprising in combination with a sliding gear transmission and gear shifting means, a pair of rotating and sliding elements provided with selective means for operating the gear shifting device, means carried adjacent the steering wheel for actuating the selective means, and a pedal lever for operating said selective means when the pedal is pressed forward.

5. A gear selecting and changing device comprising a sliding gear transmission, a pair of gear shifting bars extending beyond the transmission, fingers secured on said gear shifting bars, a rotating and reciprocating member provided with pins for engaging said fingers to shift the bars, a crank arm carried within the periphery of the steering wheel, a connection between said crank arm and said rotating and reciprocating member for selecting the desired fingers for shifting said gears.

6. A gear selecting and changing device provided with a sliding gear transmission, gear shifting bars provided with forks said bars extending beyond the transmission, fingers carried by said extension of the gear shifting bars, rotating and reciprocating drums provided with pins for engaging said fingers for operating said bars, means located adjacent the wheel for effecting the desired selection of the gears, a pedal, and a lever connection to said pedal for reciprocating said drums when the pedal is pressed forward.

7. In a gear changing device, a sliding gear transmission, gear shifting bars extending beyond the transmission, a pair of drums provided with pins for shifting said bars, a pedal and a lever connection between said pedal and said drums for moving them both toward each other simultaneously when the pedal is pushed forward and thereby operate the gear shifting bars.

8. In a device of the class described, a clutch and its operating pedal, a sliding gear transmission provided with gear shifting bars, means extending beyond the transmission drum rotatably and slidably mounted for actuating said bars, a gear selecting device mounted adjacent the wheel and including an indicator for showing the selected gear, and means actuated by the forward movement of the clutch pedal for operating the drums thereby operating the gear shifting bars.

9. In a gear selecting and changing device for motor vehicles, a clutch, a sliding gear transmission provided with a casing and with gear shifting bars extending through the casing and beyond the transmission, fingers mounted on said gear shifting bars for actuating the same, a rotating and reciprocating member provided with pins located adjacent to the fingers for engaging the fingers to operate said bars, a manually controlled means located adjacent the steering wheel of the vehicle for positioning any of the pins located on said rotating and reciprocating member so as to engage either of the fingers on said bars, a clutch pedal and a rod and lever connection between said pedal and rotating and reciprocating member for changing the position of said rotating and reciprocating member when the clutch is thrown out of engagement.

10. In a device of the class described for use on motor vehicles, a sliding gear transmission provided with gear shifting bars, a steering column, a steering wheel mounted on said column, a dial located within said steering wheel rim and marked to denote first, second and third speed, reverse and neutral, a shaft extending through the steering column and dial, an arm provided with a pointer and detent mounted on said shaft, rotating and reciprocating members located adjacent to the gear shifting bars and provided with pins projecting therefrom for operating said bars, and means operated by the foot of the operator for shifting either of said bars to produce the position of the gears as indicated on the dial.

11. A device of the class described comprising a sliding gear transmission provided with gear shifting bars, rotating and reciprocating members located adjacent said bars, pins carried by said rotating and reciprocating members for operating said bars, a manually controlled means to adjust said rotating and reciprocating member for operating either one of said bars, and a lever mechanism for moving said rotating and reciprocating members to and from each other simultaneously.

12. A device of the class described comprising a sliding gear transmission provided with gear shifting bars, a rotating and reciprocating member located adjacent said bars, each of said bars being provided with a notch, a spring pressed dog located adjacent said bars, a selective connection between said bar and rotating and reciprocating member for operating said bars, a cam mounted on said member for locking the bar not in use in neutral position, a manually controlled means for adjusting said rotating and reciprocating member for operating either one of said bars.

In testimony whereof, I have signed my name to this specification, in presence of two subscribing witnesses.

JASPER BLACKBURN.

Witnesses:
JEAN GOLDBERG,
EDWARD E. LONGAN.